United States Patent
Kurosawa (10) Patent No.: US 7,738,483 B2
(45) Date of Patent: Jun. 15, 2010

(54) SYSTEMS AND METHODS FOR MANAGING COMMUNICATION BETWEEN MASTER AND SLAVE DEVICES

(75) Inventor: Yasuhiko Kurosawa, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 781 days.

(21) Appl. No.: 11/221,497

(22) Filed: Sep. 8, 2005

(65) Prior Publication Data

US 2007/0053375 A1    Mar. 8, 2007

(51) Int. Cl.
*H04L 12/42* (2006.01)
(52) U.S. Cl. .................. 370/450; 370/395.7; 710/110
(58) Field of Classification Search ......... 370/450–463, 370/412, 413; 710/110; 711/202
See application file for complete search history.

(56) References Cited

U.S. PATENT DOCUMENTS

| | | | | |
|---|---|---|---|---|
| 5,784,590 | A | * | 7/1998 | Cohen et al. ............... 711/122 |
| 5,881,264 | A | | 3/1999 | Kurosawa |
| 5,897,656 | A | * | 4/1999 | Vogt et al. ................. 711/141 |
| 6,014,734 | A | * | 1/2000 | Tran et al. ................... 712/23 |
| 6,112,019 | A | * | 8/2000 | Chamdani et al. ........... 712/214 |
| 6,240,479 | B1 | * | 5/2001 | Snyder et al. ............... 710/113 |
| 6,418,515 | B1 | | 7/2002 | Kurosawa |
| 6,757,288 | B1 | * | 6/2004 | Deml et al. ............... 370/395.7 |
| 7,203,780 | B2 | * | 4/2007 | Asano et al. ................ 710/110 |

FOREIGN PATENT DOCUMENTS

| JP | 5-242022 | 9/1993 |
|---|---|---|
| JP | 7-105126 | 4/1995 |
| JP | 2003-196230 | 7/2003 |

OTHER PUBLICATIONS

J Hennessy et. al, "Computer Architecture: A Quantitative Approach", Third Edition, 2002, pp. 528-541.
J Hennessy et. al, "Computer Architecture: A Quantitative Approach", Second Edition, 1996, 635-647.
David Culler et. al, "Parallell Computer Architecture: A Hardware/Software Approach", 1999, pp. 269-283.

* cited by examiner

*Primary Examiner*—Jason E Mattis
*Assistant Examiner*—Dady Chery
(74) *Attorney, Agent, or Firm*—Law Offices of Mark L. Berrier (57) ABSTRACT

Systems and methods for increasing the efficiency of communications between master devices and slave devices in a system. A master normally sends a command to a slave if a token from the slave is received. Determining whether a token is of the correct type requires multiple processing cycles. Alternatively, if all of the slaves have available buffer slots, an "all token available" signal is asserted. When the "all token available" signal is received, the master can send any command without having to decode any of the tokens.

18 Claims, 7 Drawing Sheets

SYSTEMS AND METHODS FOR MANAGING COMMUNICATION BETWEEN MASTER AND SLAVE DEVICES

BACKGROUND OF THE INVENTION

1. Field of the Invention

The invention relates generally to systems and methods for managing the communication between master and slave devices. More particularly, the invention relates to systems and methods for increasing the efficiency of communicating to master devices the availability of slave devices to accept commands from the master devices.

2. Related Art

Many of today's high-performance systems include a plurality of processors as well as a plurality of other devices—such as memories and input/output (I/O) devices. The processors typically act as master devices that control, communicate with, and send commands to the other devices that act as slaves. Memories, for example, act as slaves. I/O devices can typically act as both masters and slaves. Communication between the master and slave devices in such systems is typically accomplished with a bus that interconnects all of these devices. In many recent multiprocessor systems, the masters and the slaves are connected by a more sophisticated interconnection network such as a crossbar switch, a ring, a torus, or the like. Because many tightly coupled multiprocessor systems require coherent memory systems, and because most of them require the address/command interconnections to logically behave as "coherent bus," such interconnection networks will be referred to in this disclosure as "buses." Busses have limited bandwidth that must be shared between all the devices on the bus. The communications between the different devices should therefore be as efficient as possible. For example, any unnecessary communication that uses up bandwidth on the bus should be eliminated.

Master devices such as processors control slave devices by sending commands and other instructions to the slave devices over the bus. In one embodiment, a slave device has a buffer for holding commands until they can be serviced by the slave. Before sending a command to a slave device, in this embodiment, the master device must determine that the slave device's buffer has available slots to accept the command/instructions. Otherwise, the slave device retries the command and the master has to send the command again. If many commands must be retried, the bandwidth of the address/command bus is consumed by useless transactions, and the performance of the system is reduced. An inquiry to determine the availability of a slave device is therefore sent by the master device, and a response is sent back by the slave device indicating whether the slave device's buffer has available slots. If a slave device responds that buffer slots are available, the master device can send a command or other instruction to the slave device. Such inquiry/response-type communications require bus bandwidth and can thus have an effect on the system's performance.

One way to reduce the number of such inquiry/response-type communications and to optimize the utility the bus is to implement a token methodology. If a slave device has available slots in its buffer, the slave device sends one or more tokens that identify the slave device to a global token manager. The number of tokens sent by the slave device is equal to the available buffer slots. When a master device needs to send a command to a particular slave device, the master device sends a request to the token manager asking for a token corresponding to that particular slave device. If a token corresponding to that slave is available, the master can send the command to the slave device over the internal bus. If a token corresponding to that slave device is not available, the master device does not send the command and may or may not resubmit a request for a token at a later time.

Though very beneficial to the bus bandwidth, implementation of the token methodology requires additional steps/clock cycles. Typically, the local token manager in the master first decodes the command that it needs to send in order to determine which type of token is required. After the token type has been determined, the local token manager in the master sends the token request to the global token manager, and the global token manager sends back the token to the local token manager if the requested token is available in the global token manager. In today's high-speed systems, the steps/clock cycles required to complete this process each time a request is made can adversely affect performance.

What is needed, therefore, are systems and methods that can increase the speed and efficiency of communication between master and slave devices by reducing the time required to process requests for tokens.

SUMMARY OF THE INVENTION

One or more of the problems outlined above may be solved by the various embodiments of the invention. Broadly speaking, the invention includes systems and methods for increasing the efficiency of communication between master devices and slave devices in a system. If all of the slave devices have slots available in their command buffers, an "all available" signal is generated. The master devices can detect the "all available" signal and determine that a slave device is available to accept any kind of command without using the additional steps/clock cycles that would otherwise be required to determine whether a particular token is available.

According to one embodiment, the master devices are configured to send a command to a slave device in response to an availability of the particular type of slave device to receive that type of command by using "tokens." Each slave device is configured to send a token corresponding to the slave device to the global token manager to indicate the availability of the slave device. The global token manager sends the token to a master device that has been requested by the master device. If all the slave devices are available, all of the different types of commands can be accepted, so the global token manager asserts an "all token available" signal which is sent to the master devices. A master device can determine the availability of a slave device by determining whether the "all token available" signal has been asserted. If the "all token available" signal has been asserted, indicating that all of the slave devices are available, no additional steps/clock cycles are required for the master device to decode a token to determine whether it is the type needed.

Alternatively, a master device determines the availability of a slave device by determining the availability of a token corresponding to the slave device at the local token manager which is implemented inside the master device. The local token manager inside the master device initially has all kinds of tokens, and the master consumes the required token when it sends a command to the bus. The master device sends a request for the consumed token to the global token manager after it sends the command to the bus. If the requested token is available at the global token manager, the global token manager sends a "replacement token" to the master. In this embodiment, if the master device has all kinds of tokens, the local token manager inside the master device generates an "all token available" signal that is sent to the master and the master can send the command before it decodes the type of the token for the command.

In another embodiment, each of the master devices may be assigned to one or more groups, each group including one or more of the master devices. A backpressure signal is asserted indicating that a particular slave device is available to accept commands from the master devices in a particular group. The backpressure signal is asserted if the number of available buffer slots is greater or equal to a threshold value established for each group-slave device (or group of slave devices) pair. The threshold value, in one embodiment, may be equal to the number of master devices in the group.

An "all available" signal is asserted to a particular group in response to the availability of each of the slave devices to receive commands from the master devices in the particular group. That is, the "all available" signal is asserted to a group if all the backpressure signals from all the slave devices have been asserted. Then, a master device can determine the availability of a slave device by determining that the "all available" signal corresponding to the master device's group has been asserted, omitting the additional steps/clock cycles that would otherwise be required.

The various embodiments of the present invention may provide a number of advantages over the prior art. For example, master devices can determine whether slave devices are available without the additional steps/clock cycles of decoding and comparing. Similar advantages may be provided in other embodiments involving other types of agents and resources.

BRIEF DESCRIPTION OF THE DRAWINGS

Other objects and advantages of the invention may become apparent upon reading the following detailed description and upon reference to the accompanying drawings.

While the invention is subject to various modifications and alternative forms, specific embodiments thereof are shown by way of example in the drawings and the accompanying detailed description. It should be understood, however, that the drawings and detailed description are not intended to limit the invention to the particular embodiment which is described. This disclosure is instead intended to cover all modifications, equivalents and alternatives falling within the scope of the present invention as defined by the appended claims.

DETAILED DESCRIPTION OF EMBODIMENTS

One or more embodiments of the invention are described below. It should be noted that these are exemplary and are intended to be illustrative of the invention rather than limiting.

Broadly speaking, the invention includes systems and methods for increasing the efficiency of communication between master devices and slave devices in a system. In one embodiment, in response to all of the slave devices being available, an "all available" signal is generated. The master devices can detect the "all available" signal and determine that a slave device is available without the additional steps/clock cycles that would otherwise be required to determine whether a particular slave is available.

While the invention is widely applicable to different types of systems, it is impossible to include all of the possible embodiments and contexts of the invention in this disclosure. The present disclosure therefore focuses on a few exemplary embodiments that are implemented in multi-processor computing systems. It should be noted that these embodiments are intended to be illustrative rather than limiting. Upon reading this disclosure, many alternative embodiments of the present invention will be apparent to persons of ordinary skill in the art. All these alternative embodiments are within the scope of the appended claims.

In one embodiment of the present invention, one or more of the master devices are configured to send commands to the slave devices in response to determining an availability of the slave device using a token method. A slave device may communicate its availability by sending a token corresponding to the slave device to the global token manager. A master device may determine the availability of a particular slave device by requesting a token corresponding to the slave device from the global token manager. In one embodiment, the local token manager may be required to decode the request to determine the type of token requested and to compare the token to the available tokens to determine whether the token is available. In response to receiving the appropriate token from the global token manager, a master device can send a command to the particular slave device.

The additional steps of decoding/comparing may be omitted in response to all of the slave devices being available. In one embodiment, an "all token available" signal is generated to indicate that all the slave devices are available. Upon determining that the "all token available" signal has been asserted, the master device may bypass the additional steps/clock cycles that would otherwise be required and send a command to the appropriate slave device. In other embodiments, alternatives methods to the token scheme may be used to communicate to the master devices the availability of slave devices to receive a particular type of command.

The various embodiments of the present invention may provide a number of advantages over the prior art. For example, master devices can determine whether slave devices are available without the additional steps of decoding tokens for the command and determining whether the tokens are of the type requested. Similar advantages may be provided in other embodiments involving other types of agents and resources.

Figure 1:
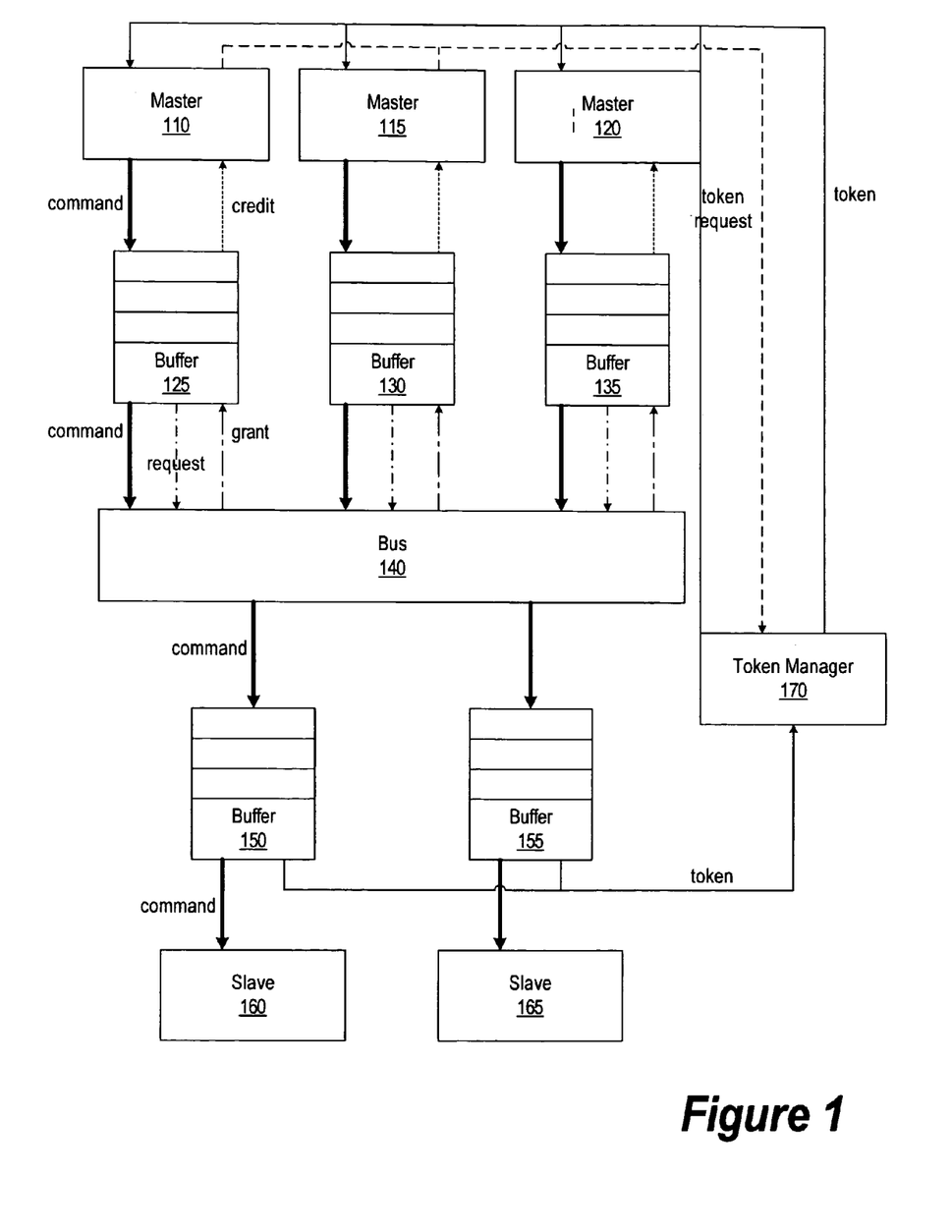
FIG. 1 is a block diagram illustrating a system facilitating the communication between master and slave devices according to one embodiment.

Referring to FIG. 1, a block diagram illustrating a system facilitating the communication between master and slave devices according to one embodiment is shown. It should be noted that, in this figure, the bold unbroken lines represent commands, the lighter unbroken lines represent tokens, the dotted lines represent credits, the dashed lines represent token requests, the dashed-dotted (-•-•-) lines represent requests, and the dashed-dashed (————) lines represent grants.

Master devices 110, 115, and 120 are configured to send commands to slave devices 160 and 165 through bus 140. In a system that uses conventional methods, master devices (110, 115, 120) can send commands to a slave device (160, 165) if the buffer (150, 155) attached to the slave device has available buffer slots. For example, slave device 160 can accept commands if buffer 150 has available slots, and slave device 165 can accept commands if buffer 155 has available slots. In this system, a request-grant scheme may be used to determine the availability of the buffers. In a request-grant scheme, the master device (110) first sends an inquiry to the holding buffer (125) to determine the availability of the slave device. The buffer 125 sends a response back to the master device 110 indicating whether the buffer is available to receive the command. If a "token" is not implemented in this system, the buffer (150,155) of the slave device will send a retry response to the command when there are no slots to receive the command.

In one embodiment, master devices 110, 115, and 120 may be attached to buffers 125, 130, and 135 respectively. Buffers 125, 130, and 135 are configured to receive and hold commands from master devices while a determination is being made whether the appropriate slave device can accept the commands. In order to communicate to each of the master devices whether the buffer has available buffer slots to receive and hold commands from the master devices, a "credit" scheme may be established. In this scheme, a buffer (for example, 125) sends to the corresponding master device (for example, 110) a number of credits equal to the number of available slots in the buffer. The master device (110) can then send a command to the corresponding buffer (125) if the master device has available "credit". When the master sends the command, the master (110) consumes the "credit" internally. After the command in the buffer (125) is sent to the bus, the buffer (125) sends the replacement "credit" to the master (110). If a master device does not have available credit, the master device waits to send the command until the buffer sends the replacement "credit" to the master. This mechanism is used to prevent buffer (125) overflow and to reduce the communication overhead of the "request-grant" scheme.

To complement this credit scheme, the slave devices may communicate their availability to accept commands from the master devices using a token scheme. In the token scheme, the slave devices generate a token for each available slot of the buffer corresponding to the slave device. The tokens from the slave devices are sent to the global token manager 170, which is configured to receive and store the tokens sent from all the slave devices. When a master device needs to send a particular type of command to a slave device, the master device is configured to determine whether token manager 170 has the desired type of token. If a token for the particular type of slave device is available, the master device may then send the command to the slave device. Otherwise, if a corresponding token is not available, the target slave device may send a retry response to the command, and the master device may send the command again at a later time.

The communication between the buffers for the masters (125, 130, 135) and the bus 140 and the communication between the bus and the buffers for the slaves (150, 155, 160) in a conventional system may, for example, use a request-grant scheme. The buffer of the master 125 sends an "address bus request" to the bus 140. The central arbiter inside the bus performs the arbitration and if the bus 140 and the target slave 150 can accept the request, the bus sends a "grant" to the buffer 125. After the "grant" signal is received, the buffer 125 sends the command to the bus 140. The bus 140 sends the command to the target slave 150. Because this system implements a "token" scheme, the slaves will send retry responses to the commands very rarely.

In one embodiment, a master device initially may have a copy of each type of token. After sending a command to a slave device and consuming a corresponding token, a master device requests a replacement token of the same type before the master device can send another command corresponding to that type of token. Alternatively, a master device initially may not have a copy of any of the tokens required to send commands to the slave devices. The master device would then obtain a token from token manager 170 when the master device needs to send a command to a slave device.

In the first embodiment in which the master initially has all kinds of tokens, the local token manager inside the master device decodes the request and determines which token is required to send this request. The local token manager then checks to see if the required token is available at the local token manager inside the master. If the local token manager has all kinds of tokens, it generates an "all token available" signal. If an "all token available" signal is generated and the master has a credit, the master can send any kind of command to the bus. Thus, the master sends the command to the bus before it decodes the type of the token for the command.

In the second embodiment in which the master does not have all kinds of tokens, local token manager inside master device 110 decodes the request in order to determine the type of the token needed by the master device. Subsequently, the local token manager inside the master device 110 sends a token request to the global token manager. If the requested token is available in the global token manager, it sends the requested token to the master device. After the master device receives the requested token, the master sends the corresponding command to the slave device. If every type of token is available at the global token manager, the global token manager, or another device in other embodiments, can assert an "all token available" signal indicating that a token of each type is already available at the token manager. A master device can then examine the "all token available" signal to determine whether the signal has been asserted. If the master device determines that the "all token available" signal has been asserted, it is not necessary for the master device to decode the command to decide whether the master can send the command or not. The master device knows that the needed token is available, so it can send the command immediately (without decoding the token type of command).

In both cases, the master has to send the token request to the global token manager later because the global token manager manages the remaining tokens and the token corresponding to the command has to be consumed. The first embodiment is better if the system use the "credit" scheme. The second embodiment works as well as the first embodiment if the system uses the "request-grant" scheme.

Figure 2:
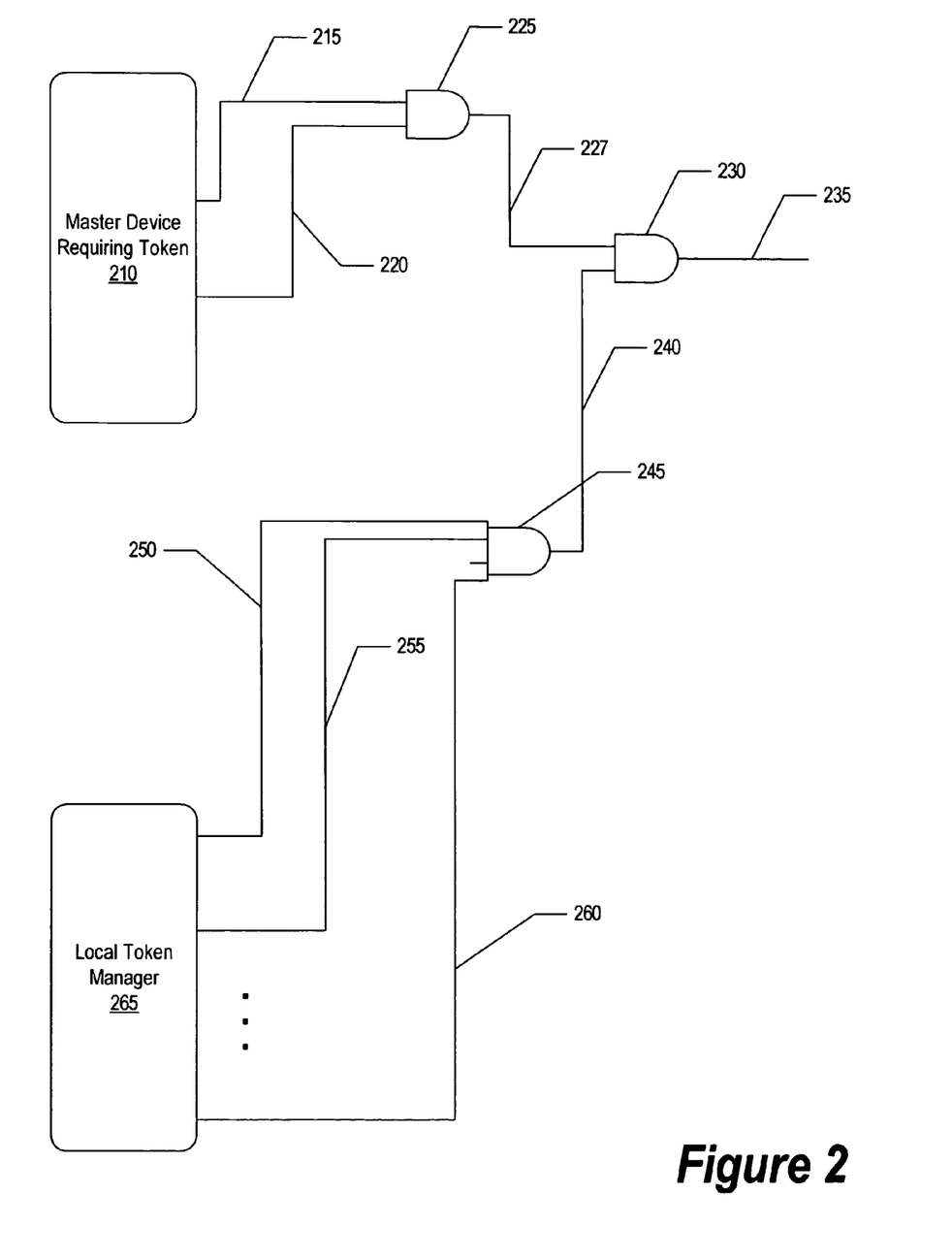
FIG. 2 is a block diagram illustrating a system for determining whether to assert an "all token available" signal to master devices attempting to communicate with slave devices according to one embodiment.

Referring to FIG. 2, a block diagram illustrating a one embodiment of a system for determining whether to assert an "all token available" signal to the master devices according to one embodiment is shown. The "all token available" signal enables the token manager, or whichever device is performing this function, to avoid the additional steps of decoding a token request to determine the type of token requested and comparing the request to the available tokens to determine whether the requested type is available.

The credit manager in the master device 210 asserts a request signal on line 215 whenever the master device has a request. Master device 210 may require a particular type of token in order to send a command to a corresponding slave device. AND gate 225 is configured to receive the request signal on line 215 as well as a credit signal on line 220. Credit signal 220 is asserted when a master device has a credit from a master device's outgoing buffer indicating that the buffer has available buffer slots and therefore can accept commands from the master device. If the master device has the necessary credit and places a request for a particular token, AND gate 225 asserts signal on line 227 indicating that that both the credit and request signals have been asserted. The signal on line 227 is then applied to AND gate 230. AND gate 230 is responsible for generating a bypass signal on line 235 that indicates whether the procedure for checking if a particular type of token is available is necessary.

A local token manager 265 inside a master device is configured to generate the token availability signals on lines 250, 255, . . . , 260. Each signal corresponds to each of the token types the local token manager can hold. A signal is asserted if a token type corresponding to that signal is available at the local token manager. AND gate 245 is configured to receive the token availability signals and to generate the "all token available" signal on line 240. The "all token available" signal is generated if all the token availability signals have been asserted indicating that a token of each type is available at the local token manager.

If the master has a command to send and the "all token available" signal has been asserted, AND gate 230 is configured to generate a bypass signal on line 235. When the bypass signal is asserted, the master device can send commands to any slave device without first decoding/comparing available tokens to determine whether a slave device is available. If, on the other hand, the master has a command to send and the "all token available" signal has not been asserted, AND gate 230 does not generate the bypass signal on line 235. If the bypass signal has not been asserted, the token manager first determines the type of token being requested by the master device and then determines whether that particular type of token is available.

In another implementation, the token manager 265 may be the global token manager instead of local token manager, and the credit manager 210 exists inside the master (or the credit manager may be a copy of the credit manager inside the master that exists inside the global token manager.) If the token manager is the global one, signal 240 is connected from the global token manager to local token manager inside the master.

Figure 3:
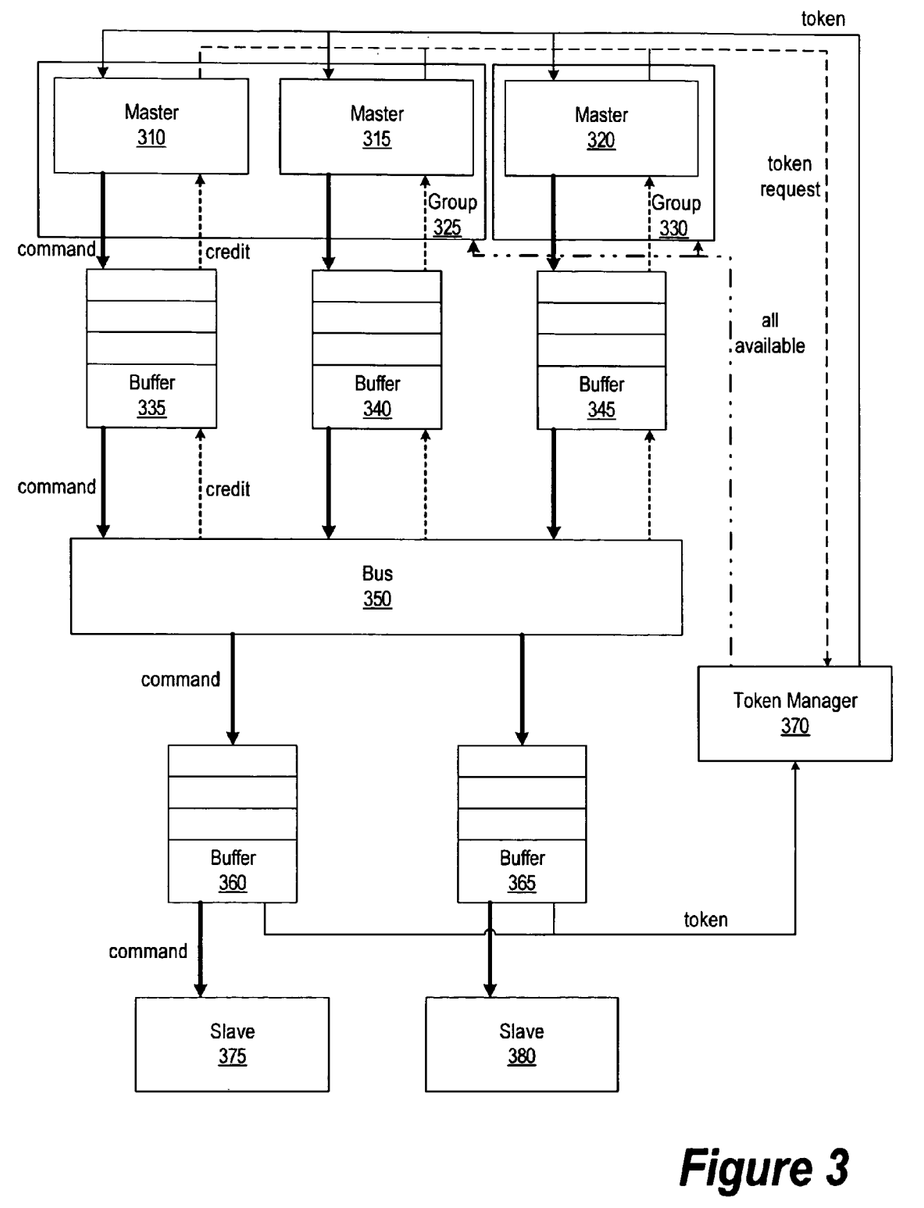
FIG. 3 is a block diagram illustrating a system facilitating the communication between groups of master devices and slave devices according to one embodiment.

Referring to FIG. 3, a block diagram illustrating a system facilitating the communication between groups of master devices and slave devices according to one embodiment is shown. The master devices are assigned to different groups in order to control the priority with which the master devices in each group can send commands to the slave devices. The combination of the masters in the groups is configurable. It should be noted that, in this figure, the bold unbroken lines represent commands, the lighter unbroken lines represent tokens, the dotted lines represent credits, the dashed lines represent token requests, the dashed-dotted lines represent requests, the dashed-dashed lines represent grants, and the dashed-dotted-dotted (-••-••-) line represents the "all token available" signal.

In the example shown in FIG. 3, master devices 310 and 315 are assigned to group 325 and master device 320 is assigned to group 330. Master devices 310, 315, and 320 send commands to slave devices 375 and 380 through bus 140. Slave device 375 can accept commands if buffer 360 has available slots and slave device 380 can accept commands if buffer 365 has available slots. Master devices 310, 315, and 320 may be attached to buffers 335, 340, and 345 respectively. Buffers 335, 340, and 345 receive and hold commands from the master devices while it is being determined whether the appropriate slave device can accept the commands. Master can send commands to its buffer if the master has one or more credits.

In one embodiment, when a master device needs to send a command to a particular slave device, the master device is configured to determine whether token manager 370 has a token corresponding to the particular slave device. If a token is available, the master device may then Take the token and send the command. Otherwise, if a corresponding token is not available, the master device may wait to send the command until the required token for the command is available.

In one embodiment, the master device decodes the type of token required for the command and the master device sends a request for the token to the global token manager 370. The first step can be eliminated by implementing an "all available" signal. If, for a particular group, every type of token is available at the token manager, there is no need for the master to decode the command to determine the type of token needed or to compare the requested type of token to the available tokens. The token manager, or another device in other embodiments, can assert an "all available" signal to that particular group indicating that a token of each type is already available at the token manager. A master device from that particular group can examine the "all available" signal to determine whether the signal has been asserted. If the master device determines that the "all available" signal has been asserted, the decoding and comparing steps can be bypassed, and the master device can send the command to the slave device.

Figure 5:
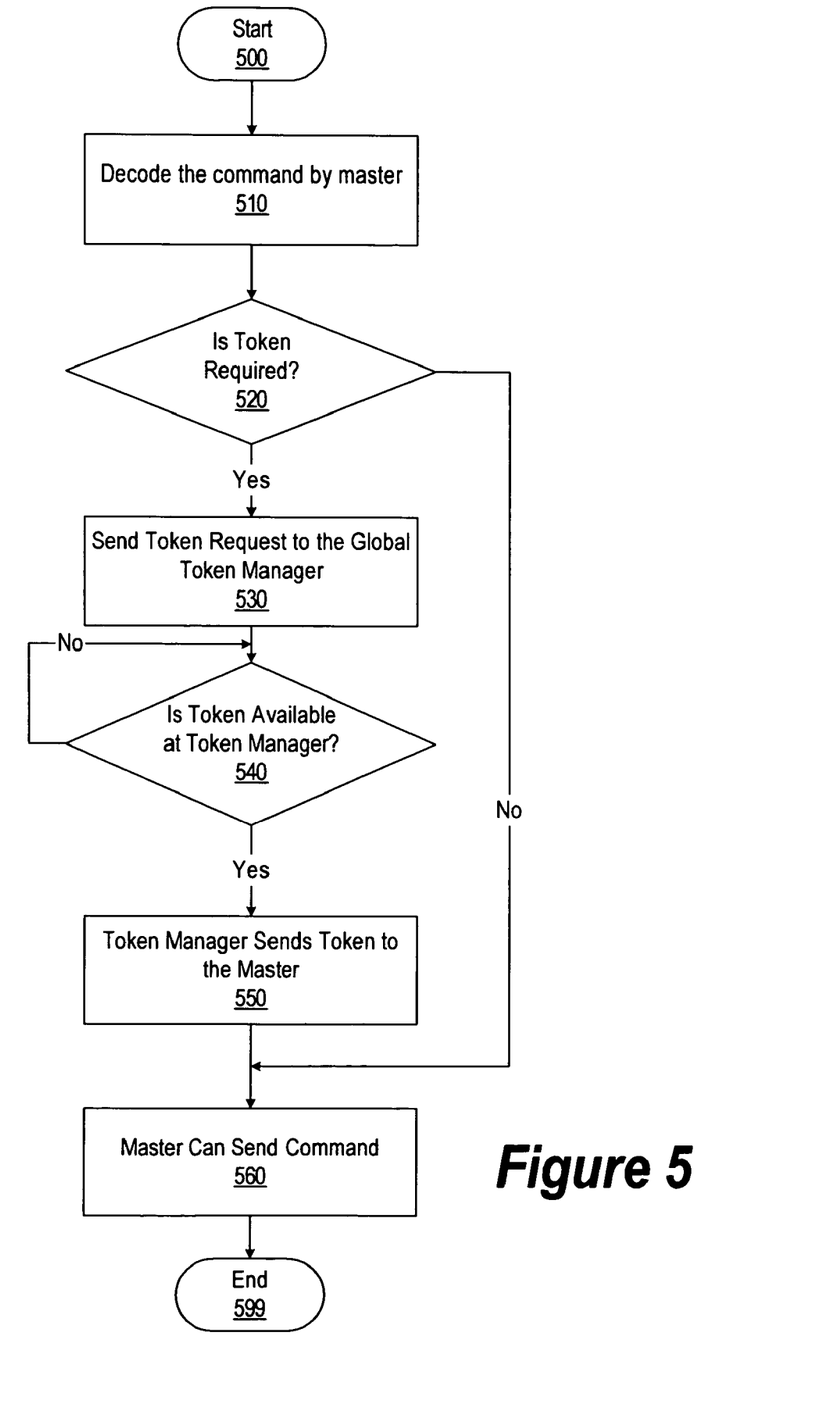
FIG. 5 is a flowchart illustrating a method for determining whether a slave device is available to receive commands from a master device using tokens according to one embodiment.

Referring to FIG. 5a, a flowchart illustrating a method for determining whether a slave device is available to receive commands from a master device using tokens according to one embodiment is shown. At 510, the command is decoded to the token inside the master. There are two types of commands, one is required token and the other is not. At 520, the master decides if the command requires the token or not. If token is not required, the master can send the command if the master has a credit (560). If the token is required, the master sends the token request to the global token manager (530). If the requested token type is available in the global token manager ("Yes" branch at 540), the token manager send the token to the master (550). If the token is not available at the token manager ("No" branch at 540), the global token manager will wait until the token is available (i.e. the global token manager will be wait until the slave sends the token to the global token manager.) After the token is available at the master, the master can send the command if it has a "credit" (560).

Figure 6:
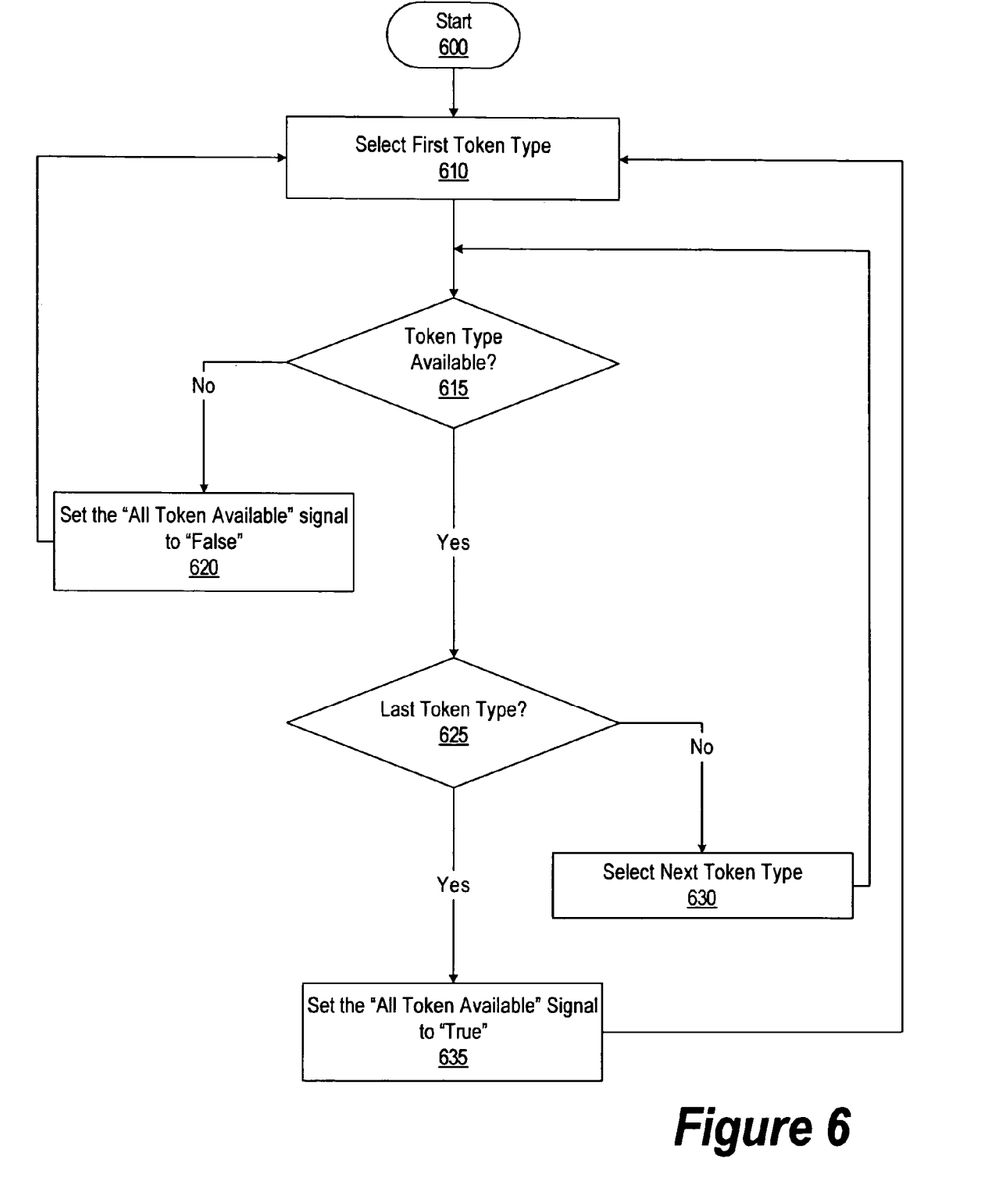
FIG. 6 is a flowchart illustrating a method for determining whether to assert an "all token available" signal by determining whether all the slave devices are available according to one embodiment.

Referring to FIG. 6, a flowchart illustrating a method for determining whether to assert an "all token available" signal by determining whether all the slave devices are available according to one embodiment is shown. In one embodiment, the "all token available" signal is asserted by the token manager. Processing begins at 600 whereupon, at block 610, the first token type is selected. A determination is then made as to whether the selected token type is available.

If at any time a token type is not available, decision 615 branches to the "no" branch where, at block 620, the "all token available" signal is set to "false" (not asserted). In one embodiment, for the "all token available" signal to be asserted, at least one of all the token types should be available at the token manager. If, on the other hand, the selected token type is available, decision 615 branches to the "yes" branch whereupon, at decision 625, another determination is made as to whether the selected token type is the last in the list of token types.

If it is not the last token type, decision 625 branches to the "no" branch, whereupon, at block 630, the next token type is selected. Processing subsequently loops back to decision 615 to determine whether the next token type is available. If, on the other hand, the selected token type is the last token type, decision 625 branches to the "yes" branch, whereupon, at block 635, the "all token available" signal is set to "true" (the signal is asserted). Asserting the "all token available" signal indicates that at least one of each type of token is available, thus eliminating the additional steps required for a master device to determine whether a particular type of token is available. Processing subsequently returns to block 610 whereupon, at block 610, the first token type is selected and the process repeats.

Figure 7:
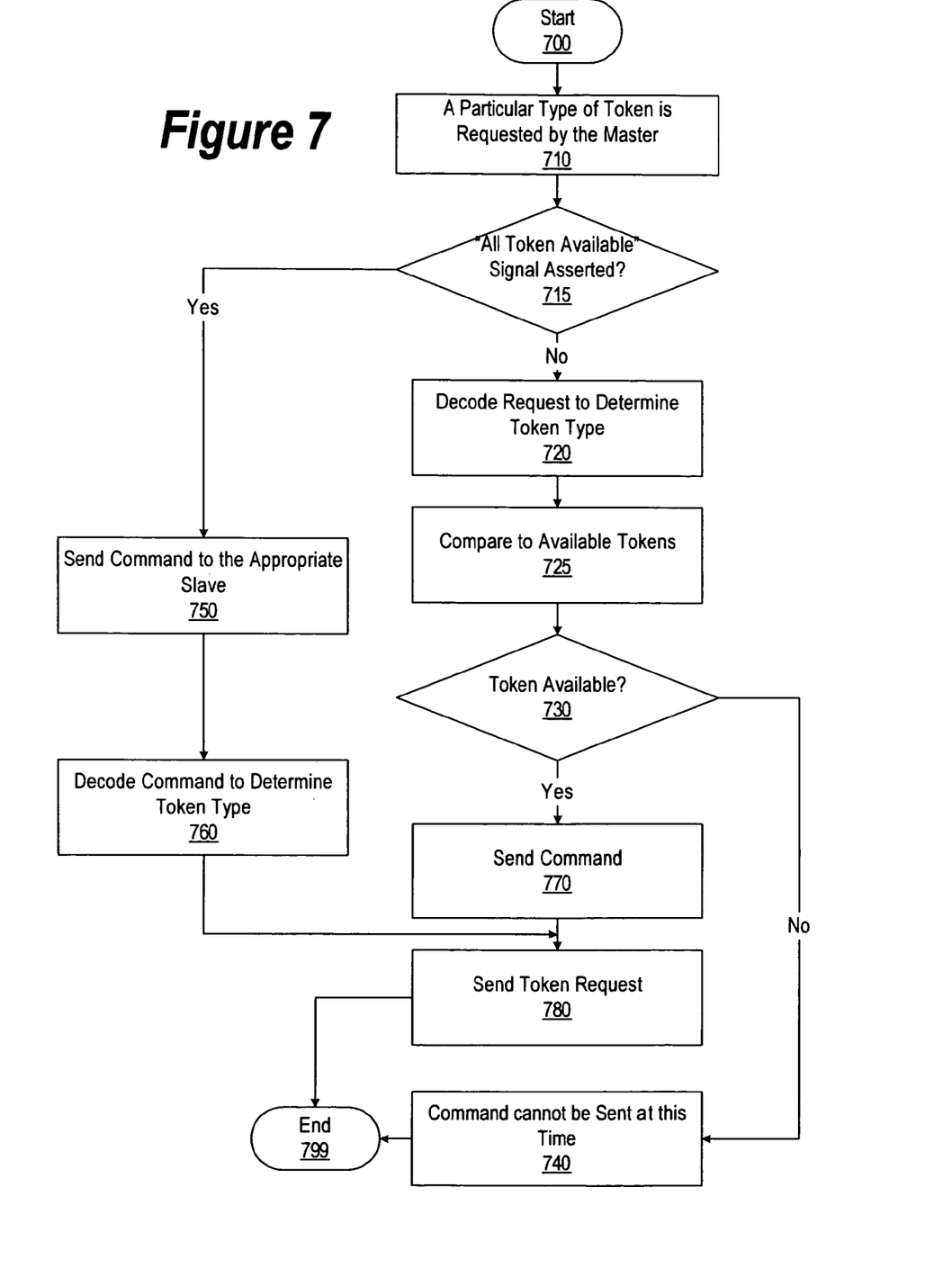
FIG. 7 is a flowchart illustrating a method for determining whether a master can send a command to a slave device by determining whether an "all token available" signal has been asserted and, if not, determining whether an appropriate token is available according to one embodiment.

Referring to FIG. 7, a flowchart illustrating a method for determining whether a master can send a command to a slave device is shown. If an "all token available" signal has not been asserted, the master device may determine whether an "all token available" signal has been asserted. If this signal has not been asserted, the master device may determine whether an appropriate token is available. Processing begins at 700 whereupon, at block 710, a particular type of token corresponding to a command is requested by the master device. In one embodiment, the type of token requested corresponds to the slave device that can service a command that the master device is attempting to send.

A determination is then made as to whether the "all token available" signal has been asserted at decision 715. If the "all token available" signal has not been asserted, decision 715 branches to the "no" branch whereupon, at block 720, the request is decoded to determine what type of token is being requested. At block 725, the requested token is compared with the other available tokens at the local token manager in order to determine whether the requested token is available.

Another determination is then made as to whether the requested token is available at the local token manager. If the token is not available, decision 730 branches to the "no" branch where, at block 740, a message is sent to the master device indicating that the command cannot be sent to the slave device at this time. Processing subsequently ends at 799. On the other hand, if the requested token is available at the local token manager, decision 730 branches to the "yes" branch where, at block 770, the command is sent to the appropriate slave device. The local token manager sends the token request to the global token manager (780). Processing again ends at 799.

Returning to decision 715, if the "all token available" signal has been asserted, decision 715 branches to the "yes" branch, bypassing block 720, block 725, and decision 730. At block 750, the command from the master device is sent to the appropriate slave device. The local token manager decodes the token and sends the token request signal to the global token manager. If the "all token available" signal is asserted, the global token manager consumes the token instead of sending it to the master. If the "all token available" is not asserted, the global token manager sends the requested token to the master (the behavior of the last part is not shown in the flowchart). Processing subsequently ends at 799.

In an alternative embodiment, the master devices may be divided into groups having different priority with respect to accessing the slave devices. An availability of a slave device to a particular group is indicated by asserting a backpressure signal corresponding to the particular group. A backpressure signal is asserted if the number of available buffer slots for a slave device is equal to or greater than the threshold value for that group-slave device (or group of slave devices) pair. If the backpressure signal is received from a slave device, any or all master devices in the group receiving the "all available" signal can send a command to the slave device asserting the backpressure signal. In one embodiment, the threshold value may be equal to the number of master devices in the group. The threshold values for each of the groups may be cumulative. That is, the working threshold for group 1 is equal to threshold 1, the working threshold for group 2 is equal to threshold 1 plus threshold 2, the working threshold for group 3 is equal to threshold 1 plus threshold 2 plus threshold 3, etc.

An "all available" signal is asserted to a particular group in response to the availability of each of the slave devices to receive commands from the master devices in the particular group. That is, the "all available" signal is asserted to a group if all the backpressure signals from all the slave devices that correspond to that group have been asserted. A master device can determine the availability of a slave device by determining that the "all available" signal corresponding to the master device's group has been asserted without requiring the additional steps/clock cycles that would otherwise be required.

The slave devices may communicate their availability to accept commands from the master devices using backpressure signals. Each of the slave devices can assert a backpressure signal to a particular group in order to indicate to the group that the slave device can accept commands from the master devices in that group. In one embodiment, a slave device asserts the backpressure signal to a particular group if the number of available buffer slots is greater than a threshold value assigned to that group. In one embodiment, a different threshold number can be assigned to each group. Furthermore, each group can have a different threshold number for each slave device or type of slave device. The threshold number for a group may, but need not be, equal to the number of master devices in the group. In one embodiment, the working threshold number—the number that each slave device uses to determine backpressure—for each group may be cumulative according to a priority of each group. For example, if it is assumed that group 330 has priority over group 325, and that group 330 has a threshold of one and that group 325 has a threshold of two, then the working threshold for group 330 will be one and the working threshold for group 325 will be three (one plus two). Thus, one buffer slot needs to be available before a slave device can assert the backpressure signal for group 330 and three buffer slots need to be available before a slave device can assert the backpressure signal for group 325.

Figure 4:
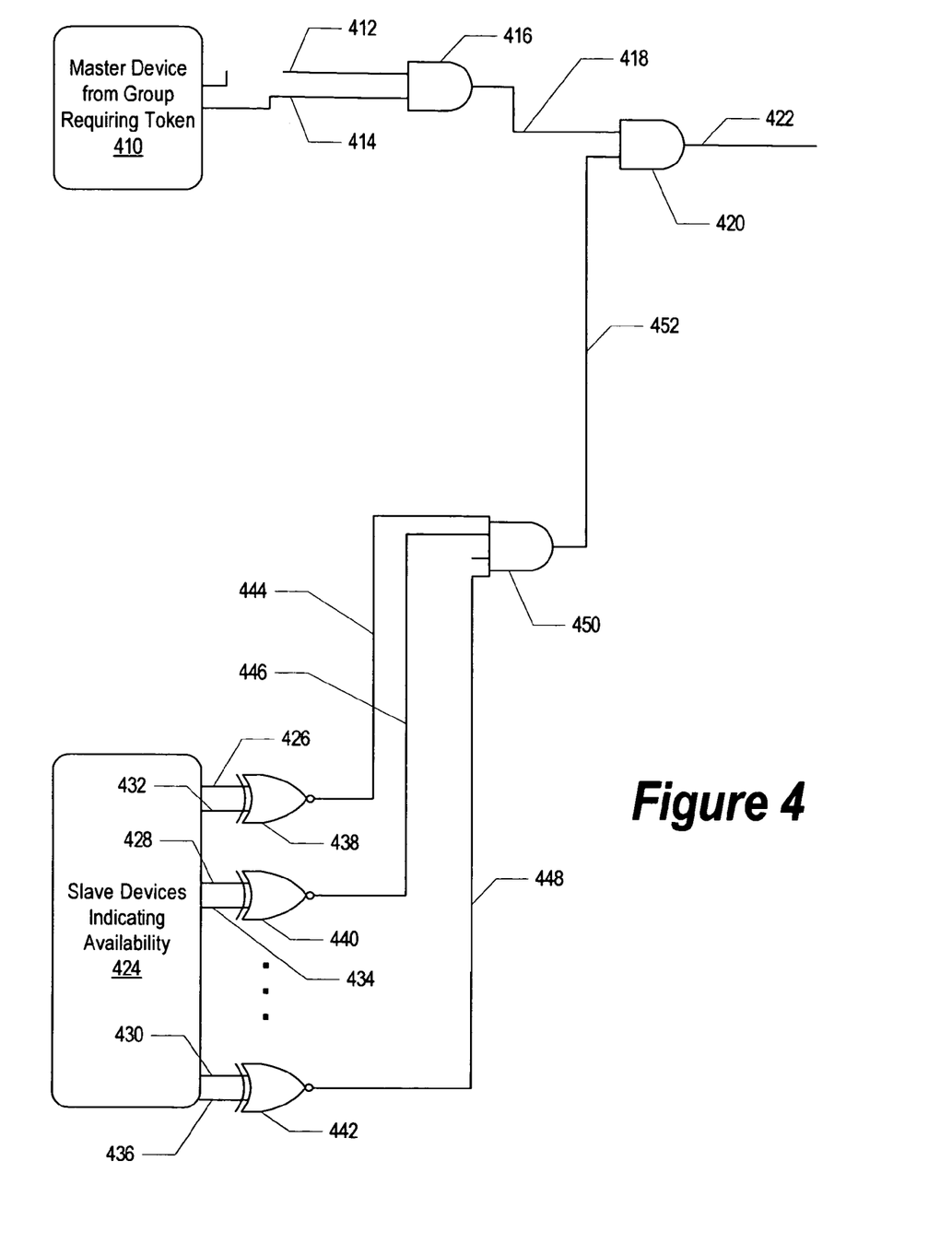
FIG. 4 is a block diagram illustrating a system for determining whether to assert an "all available" signal using "backpressure" signals to a group of master devices attempting to communicate with slave devices according to one embodiment.

Referring to FIG. 4, a block diagram illustrating a system for determining whether to assert an "all available" signal using "backpressure" signals to a group of master devices according to one embodiment is shown. The "all available" signal enables the token manager, or whichever device is performing this function, to avoid the additional steps of decoding a token request to determine the type of token requested and comparing the request to the available tokens to determine whether the requested type is available.

Master device 410 asserts request signal 412 whenever the master device has a request. Master device 410 requires a particular type of token in order to send a command to a corresponding slave device. AND gate 416 is configured to receive the request signal on line 412 as well as a credit signal on line 414. The credit signal on line 420 is asserted when a master device has received a credit from the master device's outgoing buffer indicating that the buffer has available buffer slots and thus can accept commands from the master device. If the master device has the necessary credit and places a request for a particular token, AND gate 416 asserts the signal on line 418 indicating that both the credit and request signals have been asserted. The signal on line 418 is then applied to AND gate 422. AND gate 422 is responsible for generating a bypass signal on line 422 that indicates whether the procedure for determining whether a particular type of token is available is necessary.

Slave devices 424 are configured to indicate whether each of the devices is available to receive commands from master devices in a particular group. In one embodiment, for each slave device and for each group of master devices, a first signal is generated indicating the number of available buffer slots for that slave device and a second signal is generated indicating the threshold value corresponding to that slave device and group. For example, buffer signals 426, 428, and 430 indicate the number of available buffers slots for the first, second, and nth slave device and threshold signals 432, 434, and 436 indicate the threshold numbers corresponding to the first, second, and nth slave devices.

Comparators 438, 440, and 442 are configured to receive and compare pairs of the buffer and threshold signals for each slave device. The comparators are configured to assert signals on lines 444, 446, and 448 if it is determined that the number of available buffers for the corresponding slave device is equal to or greater than the threshold number for the appropriate group and to generate backpressure signals on lines 444, 446, and 448. AND gate 450 is configured to receive the backpressure signals and to generate the "all available" signal on line 452. The "all available" signal on line 452 is generated if all the backpressure signals for a particular group have been asserted indicating that a master device from the particular group can send a command to any of the slave devices.

If a request for a token has been made by a master device (i.e., the signal on line 418 is asserted) and the "all available" signal has been asserted (on line 452), AND gate 420 is configured to generate the bypass signal on line 422. When the bypass signal on line 422 is asserted, a master device can send commands to any of the slave devices, bypassing the decoding/comparing steps that would otherwise be required to determine which backpressure signals have been asserted. If the system implements the "back pressure" scheme, the master need not send token request to the global token manager when the "all token available" signal is asserted because the global token manager does not manage the actual number of the tokens—it just refers the "back pressure" signals from the slaves instead.

In another embodiment, the local token manager is implemented in the command buffer attached to the master (for example, buffer 125 in FIG. 1). In this embodiment, the master 110 sends command to the buffer 125 if the master has a credit. The buffer 125 decodes the command and if the command requires the token, and the local token manager inside buffer 125 sends the token request to the global token manager. Other behavior is almost same as the token manager implemented inside the master.

While the disclosure of the present application discusses the invention in the context of multiprocessor computer systems that have multiple master and slave devices, it should be noted that the invention is more widely applicable and can be used in a variety of other contexts. Consequently, the disclosure should not be considered as limiting the invention to these types of systems.

"Computer" and "computer system," as used herein, are intended to include any type of data processing system capable of performing the functions described herein. "Computer-readable media," as used herein, refers to any medium that can store program instructions that can be executed by a computer, and includes floppy disks, hard disk drives, CD-ROMs, DVD-ROMs, RAM, ROM, DASD arrays, magnetic tapes, floppy diskettes, optical storage devices and the like.

Those of skill in the art will understand that information and signals may be represented using any of a variety of different technologies and techniques. For example, data, instructions, commands, information, signals, bits and symbols that may be referenced throughout the above description may be represented by voltages, currents, electromagnetic waves, magnetic fields or particles, optical fields or particles, or any combination thereof.

Those of skill will further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Those of skill in the art may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with general purpose processors, digital signal processors (DSPs), application specific integrated circuits (ASICs), field programmable gate arrays (FPGAs) or other programmable logic devices, discrete gates or transistor logic, discrete hardware components, or any combination thereof designed to perform the functions described herein. A general purpose processor may be any conventional processor, controller, microcontroller, state machine or the like. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The benefits and advantages which may be provided by the present invention have been described above with regard to specific embodiments. These benefits and advantages, and any elements or limitations that may cause them to occur or to become more pronounced are not to be construed as critical, required, or essential features of any or all of the claims. As used herein, the terms "comprises," "comprising," or any other variations thereof, are intended to be interpreted as non-exclusively including the elements or limitations which follow those terms. Accordingly, a system, method, or other embodiment that comprises a set of elements is not limited to only those elements, and may include other elements not expressly listed or inherent to the claimed embodiment.

While the present invention has been described with reference to particular embodiments, it should be understood that the embodiments are illustrative and that the scope of the invention is not limited to these embodiments. Many variations, modifications, additions and improvements to the embodiments described above are possible. It is contemplated that these variations, modifications, additions and improvements fall within the scope of the invention as detailed within the following claims.

What is claimed is:

1. A system comprising:
   a set of master devices;
   a set of slave devices; and
   a token manager;
   wherein each of the slave devices is configured to provide a corresponding token to the token manager indicating availability to accept a command from one of the master devices, wherein the token is provided in response to determining that one or more entries in a command buffer of the slave device is unfilled, and wherein the token is not associated with a specific command;
   wherein the token manager is configured to generate an "all token available" signal and to provide the "all token available" signal to each of the master devices in response to determining that tokens have been received from all of the slave devices and that all of the slave devices are available to accept commands.

2. The system of claim 1, wherein a first one of the master devices is configured to send a command to one of the slave devices in response to receiving the "all token available" signal.

3. The system of claim 2, wherein the token manager is configured to receive the tokens from the slave devices and to provide the tokens to the master devices in response to requests from the master devices.

4. The system of claim 3, wherein the first one of the master devices is configured to decode a received token and send a command to one of the slave devices corresponding to the decoded token in response to determining that the decoded token corresponds to a request sent to the token manager by the first one of the master devices.

5. The system of claim 3, further comprising a bus that is coupled to each of the set of master devices and the set of slave devices, wherein the token manager is implemented in the bus.

6. The system of claim 3, wherein the token manager is implemented in the first one of the master devices.

7. The system of claim 1, wherein one or more of the master devices are associated with one or more groups and wherein at least a first one of the slave devices is configured to assert a first backpressure signal corresponding to a first one of the groups when the first one of the slave devices is available to accept a number of commands equal to or greater than a number of master devices in the first one of the groups.

8. The system of claim 7, wherein the first one of the slave devices is configured to assert a second backpressure signal to a corresponding second one of the groups when the first one of the slave devices is available to accept a number of commands equal to or greater than a number of master devices in the second one of the groups plus the number of master devices in the first one of the groups.

9. The system of claim 7, wherein one or more of the master devices in the first one of the groups is configured to send a corresponding command to the first one of the slaves in response to receiving the first backpressure signal.

10. A method implemented in a system having a set of master devices, a set of slave devices and a token manager, wherein availability of particular types of the slave devices to accept commands from the master devices is communicated by the slave devices sending corresponding tokens to the token manager, and wherein the tokens are not associated with specific commands, the method comprising:
    the token manager asserting an "all token available" signal to at least a first one of the master devices in response to receiving tokens from all of the slave devices indicating that all of the set of slave devices are available to accept commands from the master devices.

11. The method of claim 10, further comprising the first one of the master devices sending a command to one of the slave devices in response to receiving the "all token available" signal.

12. The method of claim 11, further comprising
    each of the set of slave devices providing a corresponding token to a token manager in response to determining that the slave device is available to accept a command, and
    the token manager providing the token corresponding to one of the slave devices to the first one of the master devices in response to a request from the first one of the master devices.

13. The method of claim 12, further comprising the first one of the master devices decoding the token and sending a command to the one of the slave devices corresponding to the token in response to determining that the decoded token corresponds to the request.

14. The method of claim 12, wherein the token manager is implemented in a bus that is coupled to each of the set of master devices and the set of slave devices.

15. The method of claim 12, wherein the token manager is implemented in the first one of the master devices.

16. The method of claim 10, further comprising associating one or more of the master devices with each of one or more groups and, for at least a first one of the slave devices, asserting a first backpressure signal corresponding to a first one of the groups when the first one of the slave devices is available to accept a number of commands equal to or greater than a number of master devices in the first one of the groups.

17. The method of claim 16, further comprising, for the first one of the slave devices, asserting a second backpressure signal to a corresponding second one of the groups when the first one of the slave devices is available to accept a number of commands equal to or greater than a number of master devices in the second one of the groups plus the number of master devices in the first one of the groups.

18. The method of claim 16, further comprising one or more of the master devices in the first one of the groups sending a command to the first one of the slaves in response to receiving the first backpressure signal.

* * * * *